Figure 3:
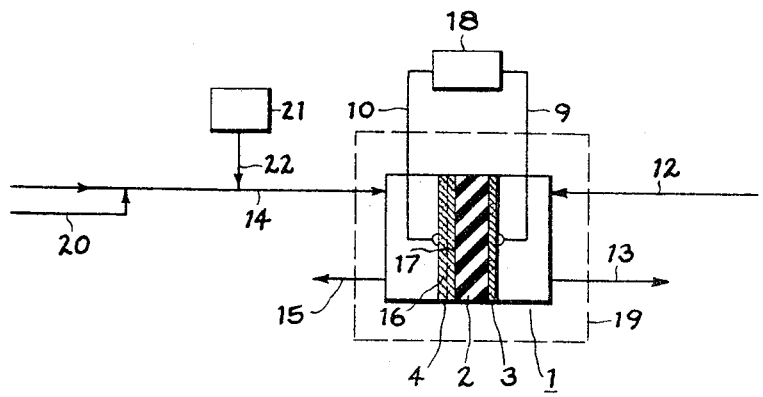

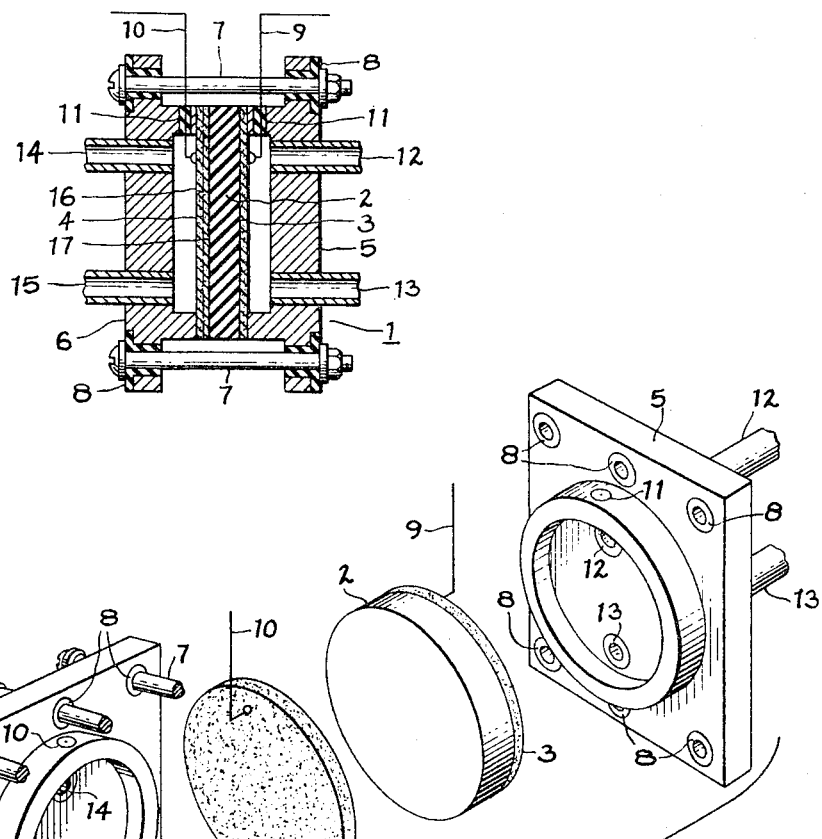
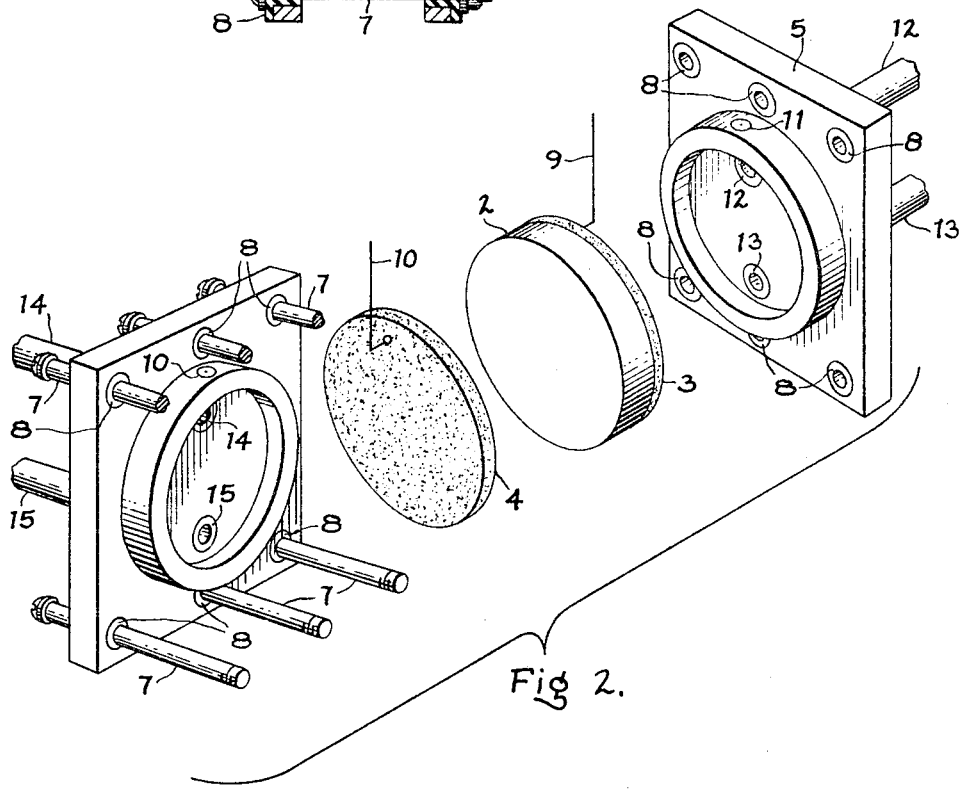

3,268,365
ALKALI CARBONATE FUEL CELL
James M. McQuade, Fort Wayne, Ind., and Robert P. Hamlen, Scotia, and Ronald R. Nilson, Schenectady, N.Y., assignors to General Electric Company, a corporation of New York
Filed Jan. 27, 1965, Ser. No. 428,337
14 Claims. (Cl. 136—86)

Our invention relates to fuel cells employing immobilized electrolytes and to a process of preventing failure of such cells through electrolyte displacement. This application is a continuation-in-part of our copending application Serial No. 183,809, filed March 20, 1962, now abandoned.

Fuel cells employing immobilized electrolytes are well known in the art. A common form of immobilized electrolyte fuel cell includes an alkali carbonate electrolyte in combination with a particulate refractory, such as magnesium oxide, which serves to physically immobilize the electrolyte as a fluid while permitting the electrolyte to retain ionic mobility. The particulate refractory alone is usually referred to as a matrix while the electrolyte and matrix in combination are generally referred to as an electrolyte component, tablet, disk, or the like. An electrolyte component is formed into a fuel cell by mounting at spaced locations thereon porous, electrocatalytic electrodes and providing suitable fixtures to deliver carbon dioxide and oxygen to one electrode and a fuel to the remaining electrode. In operation, the fuel cell is heated to a temperature of from 400° C. to 800° C. to melt the alkali carbonate electrolyte. The entering stream of oxygen and carbon dioxide is reduced to carbonate ion by the cathode. Simultaneously, the fuel is oxidized by the carbonate ion at the anode to produce carbon dioxide and water.

It is recognized that immobilized alkali carbonate fuel cells fail through loss of electrolyte from the matrix. Cell failure has been heretofore attributed to electrolyte vaporization either directly or through the formation of alkali oxides. In certain cell constructions, electrolyte loss has been attributed to possible chemical reaction of the alkali carbonate with gasket materials. It has been demonstrated that cell life can be extended by disassembling the cell and impregnating the matrix with additional electrolyte. In certain cell configurations where the electrodes are surrounded by a rigid matrix, it has been proposed to add small amounts of electrolyte directly to the electrolyte component during operation.

Upon careful inspection of electrolyte components taken from alkali carbonate fuel cells after failure under test, we have observed that the alkali carbonate is not entirely depleted from the matrix as a whole but is locally absent from the portion of the matrix adjacent the cathode. Whereas cell failure is generally attributed to an over-all deficiency of electrolyte in the matrix, it is our observation that cell failure results from lack of electrolyte at the cathode-matrix interface. While the mechanism of the displacement forms no part of our invention and is not fully understood, it is believed that the net displacement may result from the higher mobility of the carbonate ion as compared to that of the alkali metal ions. Another possible explanation of the net displacement of the electrolyte is that the anode may become corroded during operation thereby creating micropores which withdraw electrolyte from the matrix through capillary attraction.

It is an object of our invention to provide an immobilized electrolyte fuel cell of increased life and free of any tendency toward failure through electrolyte displacement away from an electrode.

It is another object of our invention to provide a system for generating electricity capable of replenishing displaced electrolyte during fuel cell operation.

It is a further object to provide a process of preventing failure of immobilized electrolyte fuel cells through electrolyte displacement.

These and other objects of our invention are accomplished by improving the contact between the electrolyte and electrodes of immobilized electrolyte fuel cells. Specifically, in fuel cells having a tendency toward failure through net displacement of the electrolyte away from one of the electrodes, we propose to provide additional electrolyte within the electrode to insure prolonged ionic continuity. The additional electrolyte may be placed in the electrode prior to cell assembly. The life of operating cells may be increased by adding electrolyte to the electrode either indirectly, as through entrainment in the reactant contacting the electrode, or directly as by applying the additional electrolyte to the exposed portions of the electrode.

Figure 4:
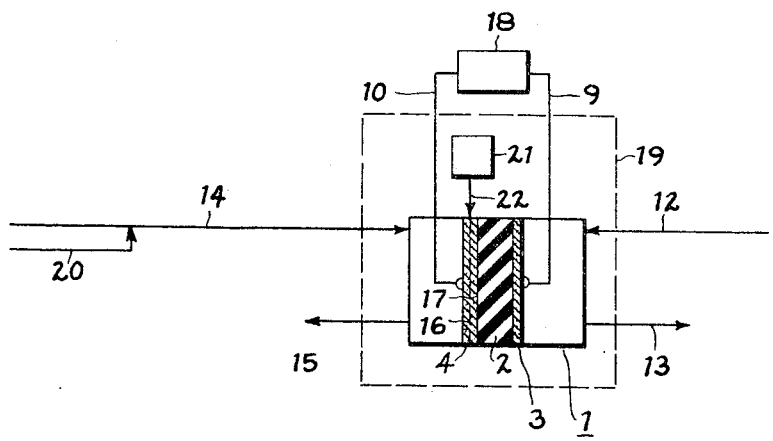

Our invention may be better understood by reference to the following detailed description taken in conjunction with the drawings in which:
FIGURE 1 is a vertical section of a fuel cell,
FIGURE 2 is an exploded perspective view of the assembled fuel cell in FIGURE 1,
FIGURE 3 is a schematic illustration of a system for adding electrolyte to the cathode during cell operation, and
FIGURE 4 is a schematic illustration of an alternate system for adding electrolyte to the cathode during cell operation.

Our invention is applicable to all fuel cells having an ionically mobile electrolyte physically held in a matrix and which suffer failure through selective displacement of the electrolyte from the interface of the matrix with one of the electrodes. Immobilized alkali carbonate fuel cells are the most prominent examples of such cells. The invention is applicable both to those electrolyte components which under the conditions of use have rigid matrices as well as to those having matrices which soften or become pasty at elevated temperatures. We may employ electrolyte components having any conventional proportion of electrolyte to matrix material. It is, however, preferred to initially employ only sufficient electrolyte to afford ionic continuity between the cell electrodes. Since additional electrolyte is added to the matrix during cell operation, it is no longer necessary to successful cell construction to employ excess quantities of electrolyte in the matrix to offset electrolyte depletion during cell use.

The composition of the electrolyte and matrix materials employed are well known and form no part of our invention. In the case of immobilized alkali carbonate fuel cells, the matrix is most commonly formed of a particulate refractory such as magnesium oxide, for example. In such matrix, the electrolyte may be formed of lithium carbonate, sodium carbonate, potassium carbonate, or similar alkali carbonates as well as mixtures thereof. Eutectic mixtures are generally preferred. A most preferred electrolyte in such cells is a ternary, equi-part by weight, eutectic mixture of lithium, sodium, and potassium carbonates. Any conventional technique of fabricating an electrolyte component may be used including casting of the matrix followed by electrolyte impregnation, casting of mixtures of matrix material and electrolyte, as well as various flame spraying techniques.

The fuel cell electrodes may be formed of any electrocatalytic material of known utility for such use. Such materials as nickel and copper as well as the oxides thereof may be employed, for example. In view of the corrosive environment within alkali carbonate cells, it is generally preferred to utilize therein electrocatalytic materials of high corrosion resistance such as metals of the light and heavy platinum triads, which are ruthenium, rhodium, palladium, osmium, iridium, and platinum, or other noble metals such as gold and silver. Silver is a generally preferred electrode material for alkali carbonate cells because of its corrosion resistance and relatively low cost.

Suitable electrodes may be formed having a porosity ranging from 20 to 95 percent by volume. Below approximately 20 percent by volume the porosity of even thin, flame-sprayed electrodes offer substantial resistance to reactant penetration. Within the range of 30 to 80 percent by volume porosity, electrodes having high structural strength and reactant penetration may be formed by sintering metal particles into unitary structures. The Armour Research Foundation publication Fiber Metallurgy by J. I. Fisher (October 1961) discloses metal structures of suitable mechanical strength for use as electrodes having porosities as high as 95 percent by volume. It is generally preferred that the average pore size of the electrodes be at least as large, preferably larger, than the pores of the matrix. As is well recognized in the art, such arrangement offsets any tendency toward selective capillary retention of the electrolyte within the electrodes. The thickness of the electrodes is not critical. Flame-sprayed electrodes having thicknesses as low as 1 or 2 mils may be employed. In order to allow for a substantial range of electrolyte displacement in use, it is generally preferred that the electrolyte impregnated electrode have a thickness of at least $\frac{1}{32}$ inch.

According to conventional fuel cell construction, the matrix is saturated with electrolyte while the electrode is maintained free of electrolyte so that an interface between the cell reactant penetrating the electrode and the electrolyte is established at the abutment of the electrode and matrix. Such a construction is vulnerable to failure even with slight displacements of the electrolyte away from the electrode, since the three-phase contact of electrocatalyst, electrolyte, and reactant is thereby destroyed.

It is our discovery that fuel cell life may be increased by shifting the interface of the electrolyte and reactant away from the abutment with the matrix and into the electrode away from which net displacement of electrolyte is observed during use. In the case of alkali carbonate fuel cells this electrode is the cathode. Such a fuel cell may be formed by impregnating an electrode with electrolyte prior to assembly. Additionally or alternately, electrolyte may be added to the electrode during cell operation as discussed in detail below. It is generally preferred to maintain the interface of the electrolyte and the reactant between the faces of the electrode. While it has heretofore been considered that incorporation of electrolyte in an electrode would result in malfunction—i.e., electrode flooding—it is our discovery that the net displacement of the electrolyte toward the matrix will offset and correct any excess electrolyte accumulation in the electrode. In the case of alkali carbonate cells the cathode effectiveness is in no way reduced by electrolyte impregnation.

Our invention may be better understood by reference to FIGURES 1 and 2 which illustrate an exemplary fuel cell 1 formed of a conventional electrolyte component 2 formed of a matrix and an electrolyte. Planar electrodes 3 and 4 are mounted on opposed faces of the electrolyte component. The electrodes and electrolyte component are mounted within a housing formed of identical gas directing fixtures 5 and 6. The housing is held together by tie-bolt assemblies 7. Insulating grommets 8 are provided in the fixtures to prevent electrical contact therebetween through the tie-bolt assemblies. Electrical leads 9 and 10 connect the electrodes 3 and 4, respectively, to an external circuit. Insulating grommets 11 are provided to prevent electrical contact of the electrical leads with the fixtures. Conduits 12 and 13 are provided in fixture 5 to allow ingress and egress of fluent reactants and products. Similar conduits 14 and 15 are provided in fixture 6. As schematically illustrated by the dashed line 16, the electrolyte forms an interface with the reactant within electrode 4 and spaced from the interface 17 of the electrolyte component and the electrode.

As will be readily appreciated by one skilled in the art, the fuel cell 1 is merely illustrative and not definitive of fuel cells constructed according to the invention. The fuel cell 1 could, for example, be readily modified by insulating the fixtures from the electrodes thereby obviating the need for grommets 8. The leads 9 and 10 could be attached to the fixtures or allowed to electrically contact the fixtures by removing grommets 11. Alternately, the electrical leads may be insulated so that grommets 11 are unnecessary. Further, it is not necessary that the fuel cell construction be formed in the planar electrode configuration. Fuel cell constructions utilizing tubular electrodes in combination with bored electrolyte components or tubular electrolyte components are well known and may readily be used. It is, of course, immaterial at what point within the electrode 4 the reactant-electrolyte interface 16 occurs. Finally, the housing fixtures need not be formed of an electrically conductive material as shown but may be formed of an insulating material such as ceramic or glass.

In operation of the fuel cell 1, a reactant toward which a net electrolyte displacement is observed in normal operation is admitted to the cell through conduit 12. In the case of a fuel cell employing alkali carbonate electrolyte in a refractory matrix such a fuel would be hydrogen, for example. Simultaneously, a reactant away from which a net electrolyte displacement is observed in normal operation is admitted to the cell through conduit 14. In the case of an alkali carbonate cell such a reactant is a mixture of carbon dioxide and oxygen or air. During the well understood oxidation-reduction reactions which follow supplying electrical energy to the leads 9 and 10, the reactant-electrolyte interface 16 initially occurring within the electrode 4 slowly migrates toward the electrode-matrix interface 17. The placement of the interface 16 within the electrode 4 sufficiently lengthens the life of the cell so that net displacement of the electrolyte out of contact with the electrode 4 ceases to be a factor contributing to cell failure.

It is not necessary to the practice of our invention, however, that the reactant-electrolyte interface be displaced into the electrode. We have discovered that additional electrolyte entrained in the reactant away from which net displacement is normally observed can prevent displacement of the reactant-electrolyte interface into the matrix out of contact with the electrode. Alternately, the additional electrolyte may be added directly to the electrode during cell operation. It is generally preferred to add additional electrolyte to the electrode when a voltage decrease is observed indicating incipient cell failure through electrolyte displacement. Additional electrolyte supplied to the electrode at this time will restore the operational cell potential and prolong the life of the cell. In the case of alkali carbonate cells having a mixture of alkali carbonates, it has been observed that lithium is lost from the cell at a higher rate than the other alkalies so that the electrolyte becomes lithium-poor. It is contemplated that the electrolyte added during cell operation may include increased proportions of any electrolyte component tending to be selectively removed from the cell. In the case of alkali carbonate cells the proportion of lithium in the added electrolyte may be increased.

The practice of the invention may be better understood by reference to FIGURE 3. For purposes of illustration an alkali carbonate fuel cell is shown of the configuration of fuel cell 1. The leads 9 and 10 of the cell 1 are shown connected to an electrical load 18. The cell is utilized in a high temperature zone the boundaries of which are schematically illustrated by dashed line 19. A fuel such as hydrogen is supplied to the cell through conduit 12. Oxygen is added to the cell through conduit 14. Carbon dioxide may be added to the oxygen as illustrated at 20. Conduit 13 removes carbon dioxide formed in the cell while conduit 15 may be employed to bleed excess oxidant and oxidant diluents, such as nitrogen, from the cell. A source of particulate alkali carbonate 21 is connected to the oxidant conduit 14 through conduit 22.

In operation of the system shown, the cell is operated according to conventional procedures until the interface 16 between the oxidant and electrolyte is displaced adjacent the interface of the electrode 4 and the electrolyte component 2. When a slight voltage drop of the cell is detected indicating incipient cell failure due to electrolyte displacement away from the electrode 4, a quantity of particulate alkali carbonate is released from the source 21 into the oxidant conduit 14 through conduit 22. The entrained alkali carbonate upon entry into the cell impinges upon and enters the electrode 4 shifting the interface 16 away from the interface 17 and restoring the cell operating potential.

An alternate arrangement is shown in FIGURE 4. The system is modified by shifting the alkali carbonate 21 and the dispensing conduit 22 so that alkali carbonate is supplied directly to the electrode 4 instead of being entrained in the oxidant. Since the source 21 and conduit 22 are shifted within the high temperature zone, the alkali carbonate is dispensed to the electrode in molten rather than particulate form. The molten alkali carbonate migrates downwardly through the electrode 4 to restore the interface 16 within the electrode.

While the practice of the invention is described with respect to a molten alkali carbonate fuel cell of the configuration shown in FIGURE 1, it is appreciated that the invention may be practiced with any fuel cell tending to fail through electrolyte displacement away from one electrode. Further, any conventional cell configuration may be employed. When a single oxidant is employed rather than a mixed oxidant as used in alkali carbonate fuel cells, the mixing conduit 20 may be eliminated. When low temperature fuel cells are used, the high temperature zone need not be present. In certain cell configurations, it may be desired to dead-end either the fuel or oxidant side of the cell so that either conduits 13 or 15 may be eliminated.

EXAMPLE 1

An electrolyte component was formed by mixing together 50 percent by weight particulate magnesium oxide passing through a 200 mesh screen and 50 percent by weight of a ternary mixture of lithium carbonate, sodium carbonate, and potassium carbonate present in equal parts by weight. After mixing the particulate material, it was placed in a mold form and pressed at room temperature and at 1000 p.s.i. to form the matrix configuration. Subsequently, the matrix was hot pressed at 700° C. and 1000 p.s.i. for 10 minutes. The matrix so formed was 1/16 inch thick and had a diameter of two inches.

After the matrix had cooled, a porous nickel electrode having a thickness of 0.006 inch and a porosity of 50 percent by volume was formed on one face of the matrix by flame spraying. This electrode constituted the anode. A cathode was formed on the opposite face of the matrix by first forming a silver plaque from silver powder sold by Andy and Harmon under the trademark "Silpowder 150." The powder was sintered into a unitary plaque having a diameter of 2 inches and a thickness of 1/16 inch by maintaining the powder at 700° C. for 6 hours. The silver plaque exhibited a porosity of 78 percent by volume. After formation, the silver plaque cathode was impregnated with an equal part by weight alkali carbonate mixture consisting of lithium carbonate, sodium carbonate, and potassium carbonate. The cathode was immersed in the molten electrolyte and subsequently placed on a sloping surface whereby excess alkali carbonate could drain away. The steps of impregnating and draining were both performed at temperatures of approximately 500° C.

The electrodes and matrix were assembled into a cell configuration similar to that shown in FIGURE 1. An oxidant consisting essentially of 33 percent by volume oxygen and 67 percent by volume carbon dioxide was fed to the cathode at a rate of approximately 150 cc./min. Hydrogen was fed to the anode at a rate approximately 150 cc./min. The cell was operated at a temperature of 650° C. with the following results.

Table I

| Volts: | Current density (ma./cm.$^2$) |
|---|---|
| 1.07 | 0 |
| 1.06 | 10 |
| 1.04 | 20 |
| 1.02 | 31 |
| 1.00 | 42 |
| 0.99 | 53 |
| 0.97 | 68 |
| 0.93 | 91 |
| 0.84 | 150 |
| 0.66 | 260 |

EXAMPLE 2

A fuel cell was formed according to the procedure of Example 1, except that the cathode was not impregnated with alkali carbonate. When operated in like manner as the fuel cell in Example 1, an open circuit potential of 0.8 volt was observed as contrasted to the 1.07 volt open circuit potential achieved with the electrolyte impregnated cathode.

EXAMPLE 3

A porous anode was provided of conventional construction formed of nickel, having a thickness of 1/32 inch, a diameter of 2 inches, and a porosity of 50 percent by volume.

Onto the anode was flame sprayed a mixture consisting of 50 percent by weight magnesium oxide passing through 200 mesh screen and 50 percent by weight of an equal part by weight mixture of lithium carbonate, sodium carbonate, and potassium carbonate. A matrix was formed having a thickness of 1/16 inch.

The anode and matrix were assembled together with a cathode formed according to the procedure set out in Example 1 in a fuel cell configuration of the type shown in FIGURE 1. The fuel cell was operated at 700° C. with an oxidant supply of approximately 150 cc./min., consisting essentially of 33 percent by volume oxygen and 67 percent by volume carbon dioxide. Hydrogen was employed as a fuel and also supplied at a rate of approximately 150 cc./min. The test results are as follows:

Table II

| Volts: | Current density (ma./cm.$^2$) |
|---|---|
| 1.09 | 0 |
| 1.01 | 14 |
| 0.96 | 20 |
| 0.81 | 40 |
| 0.69 | 60 |
| 0.50 | 100 |

EXAMPLE 4

A fuel cell matrix was formed according to the procedure of Example 1. A silver cathode was flame sprayed onto one face of the matrix to a thickness of 0.006 inch. A nickel anode was similarly flame sprayed onto the opposite face of the matrix to a thickness of 0.006 inch. The cathode and anode exhibited a porosity of 50 percent by volume.

The electrodes and matrix were mounted in a fuel cell configuration of the type illustrated in FIGURE 1. The same types and quantities of fuel and oxidant were supplied to the cell as described in Example 1. The cell was operated at a temperature of 700° C. The cell exhibited a potential of 0.83 volt with a current density of 35 ma./cm.$^2$. Using the current interrupter technique, the matrix resistance was noted to be 5.1 ohms/cm.$^2$. The procedure for obtaining resistance through current interruption is well understood in the art. A procedure of the type employed is reported in the article, "Determination of the Internal Resistance of Leclanche Cells by Square-Wave Method," by Aladar Tvarusko, published in the Journal of the Electrochemical Society, No. 7, vol. 109, July 1962.

Subsequently 0.2 gram of finely particulate alkali carbonate consisting of an equal part by weight mixture of lithium carbonate, sodium carbonate, and potassium carbonate was added to the oxidant conduit of the cell. The cell potential increased to 0.88 volt at a current density of 35 ma./cm.$^2$. The matrix resistance was again tested by the current interrupter method and found to have decreased to 2.9 ohms/cm.$^2$.

What we claim as new and desire to secure by Letters Patent of the United States is:

1. An alkali carbonate fuel cell comprising in its initial state of assembly
   an anode and a porous cathode in spaced relationship,
   means separately supplying fuel to said anode and oxidant to said cathode,
   a refractory matrix contacting said anode forming a first interface therewith and contacting said cathode forming a second interface therewith, and
   an alkali carbonate electrolyte with said matrix providing ionic continuity between said anode and said cathode forming an interface with the fuel at the first interface and said electrolyte also initially extending into said cathode forming an interface with the oxidant within said cathode entirely spaced from said second interface.

2. A fuel cell comprising in its initial state of assembly
   a porous particulate refractory matrix having first and second substantially parallel planar faces,
   an anode formed of electrocatalytic material in contact with said first face along a first planar interface,
   a porous cathode formed of an electrocatalytic material in contact with said second face along a second planar interface,
   means supplying fuel and oxidant to said anode and said cathode respectively, and
   an alkali carbonate electrolyte within said matrix and extending into said porous cathode to a uniform depth beyond said second planar interface such that all points of mutual contact between said oxidant, said electrolyte, and said electrocatalytic material lie entirely within said porous cathode and spaced from said porous particulate refractory matrix.

3. A gaseous fuel cell comprising in its initial state of assembly
   an electrolyte component including a unitary mass of alkali carbonate and refractory particles which form a paste at temperatures above about 400° C.,
   electrode layers in direct contact with opposite major surfaces of the electrolyte component, said electrode layers comprising an anode and a cathode and each layer comprising a cohered mass of catalyst metal particles forming porous bodies, said cathode being rendered impervious to gas flow therethrough by having the pores thereof initially partially filled with said alkali carbonate,
   means for supplying gaseous fuel to said anode, and means for supplying oxidant gas to said cathode, said oxidant gas containing molecular oxygen which is catalytically reactable at said cathode to produce carbonate ions which are ionically conductable by said alkali carbonate to said anode.

4. A fuel cell as recited in claim 3 in which said anode comprises a layer of hydrogen catalyst metal flame sprayed on one of said major surfaces of said electrolyte member to provide an anode which is freely permeable to the diffusion of said gaseous fuel therethrough.

5. A cathode for a gaseous fuel cell comprising prior to mounting in said fuel cell a porous cohered mass of particles of metal capable of catalytically reacting an oxidant gas containing molecular oxygen to form carbonate ions, said cathode being rendered impervious to the flow of said oxidant gas therethrough by having an alkali carbonate electrolyte initially contained within the pores thereof.

6. An improved electrical energy generating system comprising
   an immobilized alkali carbonate fuel cell located within a high temperature zone having an anode and a porous cathode,
   means separately supplying fuel and oxidant to said fuel cell, and
   means dispensing alkali carbonate to said fuel cell through said cathode during operation of said fuel cell.

7. A system according to claim 6 in which said dispensing means entrains alkali carbonate within said oxidant.

8. A process of prolonging the operating life of an immobilized alkali carbonate fuel cell comprising
   operating said fuel cell, and
   supplying additional alkali carbonate electrolyte to said fuel cell through a porous cathode of said fuel cell during operation.

9. An alkali carbonate fuel cell comprising in its initial state of assembly
   an anode,
   a cathode having a porosity ranging from 20 to 95 percent by volume,
   a refractory matrix lying between and in contact with said anode and said cathode, and
   a body of alkali carbonate electrolyte initially lying within said cathode and said matrix and forming an ionic conductive path between said cathode and said anode.

10. A fuel cell according to claim 9 in which the cathode has a porosity of from 30 to 80 percent by volume.

11. A fuel cell according to claim 9 in which the cathode has a thickness of at least 1/32 inch.

12. A fuel cell according to claim 9 in which said alkali carbonate substantially fills said cathode.

13. A process of prolonging the operating life of an alkali carbonate fuel cell having a porous cathode comprising
   operating said fuel cell to generate electrical energy, and
   supplying additional alkali carbonate to said fuel cell through said cathode.

14. The process according to claim 13 in which said additional alkali carbonate is entrained in an oxidant supplied to said cathode.

References Cited by the Examiner
UNITED STATES PATENTS

| | | | |
|---|---|---|---|
| 3,120,456 | 2/1964 | Broers | 136—86 |
| 3,160,527 | 12/1964 | Hess | 136—86 |

WINSTON A. DOUGLAS, *Primary Examiner.*

H. FEELEY, *Assistant Examiner.*